(12) United States Patent
Ikeda et al.

(10) Patent No.: US 11,343,385 B2
(45) Date of Patent: May 24, 2022

(54) IMAGE PROCESSING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Atsushi Ikeda, Toride (JP); Takeshi Kogure, Toride (JP); Hiroaki Koike, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/737,141

(22) Filed: Jan. 8, 2020

(65) Prior Publication Data
US 2020/0228669 A1 Jul. 16, 2020

(30) Foreign Application Priority Data
Jan. 15, 2019 (JP) .............................. JP2019-004621

(51) Int. Cl.
*H04N 1/00* (2006.01)
*H04N 1/32* (2006.01)

(52) U.S. Cl.
CPC ..... *H04N 1/00217* (2013.01); *H04N 1/00212* (2013.01); *H04N 2201/0094* (2013.01)

(58) Field of Classification Search
None
See application file for complete search history.

(56) References Cited

U.S. PATENT DOCUMENTS

| 5,299,018 A * | 3/1994 | Jefferson | H04N 1/00204 382/245 |
| 6,101,548 A * | 8/2000 | Okada | H04N 1/00214 709/236 |
| 6,725,413 B1 * | 4/2004 | Ishida | H04L 12/40052 714/746 |
| 6,810,445 B1 * | 10/2004 | Sato | H04L 47/10 710/33 |
| 6,854,020 B1 * | 2/2005 | Kamihara | H04L 49/901 710/1 |

(Continued)

FOREIGN PATENT DOCUMENTS

| CN | 1770811 A | 5/2006 |
| CN | 101848308 A | 9/2010 |

(Continued)

OTHER PUBLICATIONS

Office Action issued in Chinese Appln. No. 202010041090.4 dated Dec. 31, 2021. English translation provided.

*Primary Examiner* — Beniyam Menberu
(74) *Attorney, Agent, or Firm* — Rossi, Kimms & McDowell LLP

(57) ABSTRACT

An image processing apparatus capable of transmitting image data according to a predetermined protocol, includes scanning unit configured to scan a document and generating image data, receiving unit configured to receive, from an application, information which is variable for each page, and transmitting unit configured to transmit the image data for which a predetermined header which is a header of the predetermined protocol and which is different for each page is added based on the information received by the receiving unit.

9 Claims, 15 Drawing Sheets

(56) References Cited

U.S. PATENT DOCUMENTS

| | | | |
|---|---|---|---|
| 6,947,442 B1* | 9/2005 | Sato | H04L 12/40084 370/447 |
| 7,085,855 B1* | 8/2006 | Sato | H04L 12/6418 709/253 |
| 8,935,353 B1* | 1/2015 | Masputra | H04L 67/28 709/212 |
| 9,035,958 B2 | 5/2015 | Gopalasamy | |
| 2001/0015823 A1* | 8/2001 | Sato | H04N 1/32641 358/1.15 |
| 2002/0057773 A1* | 5/2002 | Fujise | H04N 1/3201 379/100.01 |
| 2002/0140960 A1* | 10/2002 | Ishikawa | H04N 1/00209 358/1.13 |
| 2003/0046368 A1* | 3/2003 | Tanimoto | H04N 1/00209 709/219 |
| 2004/0075864 A1* | 4/2004 | Kato | G06F 3/1265 358/1.16 |
| 2006/0010158 A1* | 1/2006 | Yoshida | H04N 19/597 |
| 2009/0231603 A1* | 9/2009 | Takemoto | H04N 1/00127 358/1.9 |
| 2011/0051182 A1 | 3/2011 | Sugiyama | |
| 2011/0199512 A1* | 8/2011 | Chen | H04N 1/0018 348/231.99 |
| 2011/0246781 A1* | 10/2011 | Morita | G06F 21/54 713/180 |
| 2011/0261416 A1* | 10/2011 | Kuwasaki | H04N 1/00214 358/442 |
| 2012/0081734 A1* | 4/2012 | Ikeda | H04N 1/00244 358/1.14 |
| 2013/0003114 A1* | 1/2013 | Maehira | H04N 1/00206 358/1.15 |
| 2013/0229694 A1* | 9/2013 | Tonegawa | H04N 1/00095 358/426.01 |
| 2015/0085863 A1* | 3/2015 | Wu | H04L 45/742 370/392 |
| 2016/0274847 A1 | 9/2016 | Suzuki | |
| 2016/0291963 A1* | 10/2016 | Kawamura | G06F 8/65 |

FOREIGN PATENT DOCUMENTS

| | | |
|---|---|---|
| CN | 102209167 A | 10/2011 |
| JP | 2000224369 A | 8/2000 |
| JP | 2006033610 A | 2/2006 |

* cited by examiner

FIG. 5

```
{
   "command":[
     {
        "class":"job"
     },
     {
        "parameter":{
           "jobType":"scanToHttp",
           "scanningParameter":{
                    "document":{
                 "size":"a4",
                 "orientation":"portrait"
              },
              "colorMode":"color",
              "outputFormat":"jpg",
500 ─── "separatePage":true,
              ...
           },
501 ─── "sendingParameter":{
              "url":"https://conon.jp/cloudscan?userId=00001&page={04}",
              "httpHeader":[
502 ───        "ticket: eyJ0eXAiOiJKV1QiLCJhbGciOiJIUzI1NiJ9",
                 "filename: scan20180810-page{04}.jpg"
              ],                           ─── 503
              "method":"POST"
           }
        }
     }
   ]
}
```

FIG. 6

```
{
   "command":[
     {
       "class":"job"
     },
     {
       "parameter":{
           "jobType":"scanToHttp",
           "scanningParameter":{
                    "document":{
                       "size":"a4",
                       "orientation":"portrait"
                    },
                    "colorMode":"color",
                    "outputFormat":"pdf",
600 ─────────────── "separatePage":false,
                    ...
           },
601 ─────── "sendingParameter":{
              "url":"https://hoge.go.jp/scan?user=pooh&folder=contract",
              "httpHeader":[
602 ───────       "credential: 279531",
                  "filename: image20180810.pdf"
              ],
              "method":"POST"
           }
       }
     }
   ]
}
```

FIG. 14

```
{
    "command":[
        {
            "class":"job"
        },
        {
            "parameter":{
                "jobType":"scanToHttp",
                "scanningParameter":{
                    "document":{
                        "size":"a4",
                        "orientation":"portrait"
                    },
                    "colorMode":"color",
                    "outputFormat":"jpg",
1400 ─────────  "separatePage":true,
                    ...
                },
                "sendingParameter":{
1401 ─────────  "url":"https://hogehogephenix.go.jp/upload?id=0110299604",
1402 ─────────  "httpHeader":[
                        "auth: aIKpwqQxJjfttHuxUvmc"
                    ],
1410 ─────────  "multipart":{
1411 ─────────      "type":"form-data",
1412 ─────────      "header":[
                            "Content-Type:image/jpeg",
                            "name:\"image201808211810-{03}.jpg\""
                        ]       ─────── 1413
                    },
                    "method":"POST"
                }
            }
        }
    ]
}
```

F I G. 15

```
15010 — POST https://hogehogephenix.go.jp/upload?id=0110299604 HTTP/1.1
15020 — auth: alKpwqQxJjfitHuxUvmc
15030 — Content-Type: multipart/form-data; boundary=————20180821 1811
                                                      15031        15032
15040 —————20180821 1811
        Transfer-Encoding: Chunked
15050 { Content-Type: image/jpeg ——15051
        name:"image20180821 1810-001.jpg"
        Content-Transfer-Encoding: base64

<Message body consisting of the data of the 1st page>

15060 —————20180821 1811
15070 { Content-Type: image/jpeg ——15071
        name:"image20180821 1810-002.jpg"
        Content-Transfer-Encoding: base64

<Message body consisting of the data of the 2nd page>
```

IMAGE PROCESSING APPARATUS, CONTROL METHOD, AND NON-TRANSITORY COMPUTER-READABLE STORAGE MEDIUM

BACKGROUND OF THE INVENTION

Field of the Invention

The present invention relates to an image processing apparatus, a control method, and a non-transitory computer-readable storage medium.

Description of the Related Art

U.S. Pat. No. 9,035,958 discloses a technique for transmitting, from a client computer to a server or a cloud service, image data generated via a scanning operation by the client computer. In such a technique, a file may be transmitted via an HTTP (Hypertext Transfer Protocol).

In such a technique for transmitting a scanned image via the HTTP, it is known that an image processing apparatus is configured as follows (to be referred to as a known technique hereinafter). First, an expansion application instructs firmware to scan a document. Upon receiving the instruction, the firmware scans the document based on the instruction, generates image data, and stores the data in a shared storage. The expansion application reads out the data stored in the shared storage, and transmits the data to a cloud service using the HTTP protocol while adding, to the data, information such as an HTTP header necessary for the transmission. Thus, the expansion application can generate an HTTP header and an HTTP body in accordance with the server of a destination.

Here, in a relatively inexpensive image processing apparatus, it is often required to reduce the memory capacity that can be allocated to operate the expansion application due to cost constraints. In such a case, it may be restricted to execute only one expansion application at a time. When there is such a restriction, if the expansion application takes charge of the scan transmission process as in the known technique, another application cannot be executed until the transmission via the HTTP is completed. Depending on the number of document sheets to be scanned and transmitted and the communication environment, transmission via the HTTP may take several minutes. In consideration of this, it is desirable that the expansion application does not take charge of execution of a transmission process, but the firmware takes charge of the transmission process.

However, when transmitting image data to an arbitrary server via the HTTP, even if the expansion application instructs the firmware, in a static format, about only the server information of the destination and the information necessary for authentication, HTTP transmission may not be established. This is because information necessary for establishing HTTP transmission can change depending on the service provided by the server or the image data to be transmitted by the image processing apparatus.

SUMMARY OF THE INVENTION

An aspect of the present invention is to eliminate the above-mentioned problem with conventional technology.

A feature of the present invention is to provide a technique for providing an image processing apparatus in which an expansion application need not execute a scan transmission process.

According to a first aspect of the present invention, there is provided an image processing apparatus capable of transmitting image data according to a predetermined protocol, comprising: scanning unit configured to scan a document and generating image data; receiving unit configured to receive, from an application, information which is variable for each page; and transmitting unit configured to transmit the image data for which a predetermined header which is a header of the predetermined protocol and which is different for each page is added based on the information received by the receiving unit.

According to a second aspect of the present invention, there is provided a control method for controlling an image processing apparatus capable of transmitting image data according to a predetermined protocol, comprising: scanning a document and generating image data; receiving, from an application, information which is variable for each page; and transmitting the image data for which a predetermined header which is a header of the predetermined protocol and which is different for each page is added based on the received information.

According to a third aspect of the present invention, there is provided a non-transitory computer-readable storage medium storing instructions for causing a computer to execute a method for an image processing apparatus capable of transmitting image data according to a predetermined protocol, comprising: scanning a document and generating image data; receiving, from an application, information which is variable for each page; and transmitting the image data for which a predetermined header which is a header of the predetermined protocol and which is different for each page is added based on the received information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing an example of a command for requesting a divided transmission process according to the first embodiment;

FIG. 6 is a view showing an example of a command for requesting a collective transmission process according to the first embodiment;

FIG. 14 is a view showing an example of a command for requesting a multipart transmission process according to the second embodiment;

FIG. 15 is a view showing an example of an HTTP message transmitted in the multipart transmission process according to the second embodiment;

DESCRIPTION OF THE EMBODIMENTS

Figure 1:
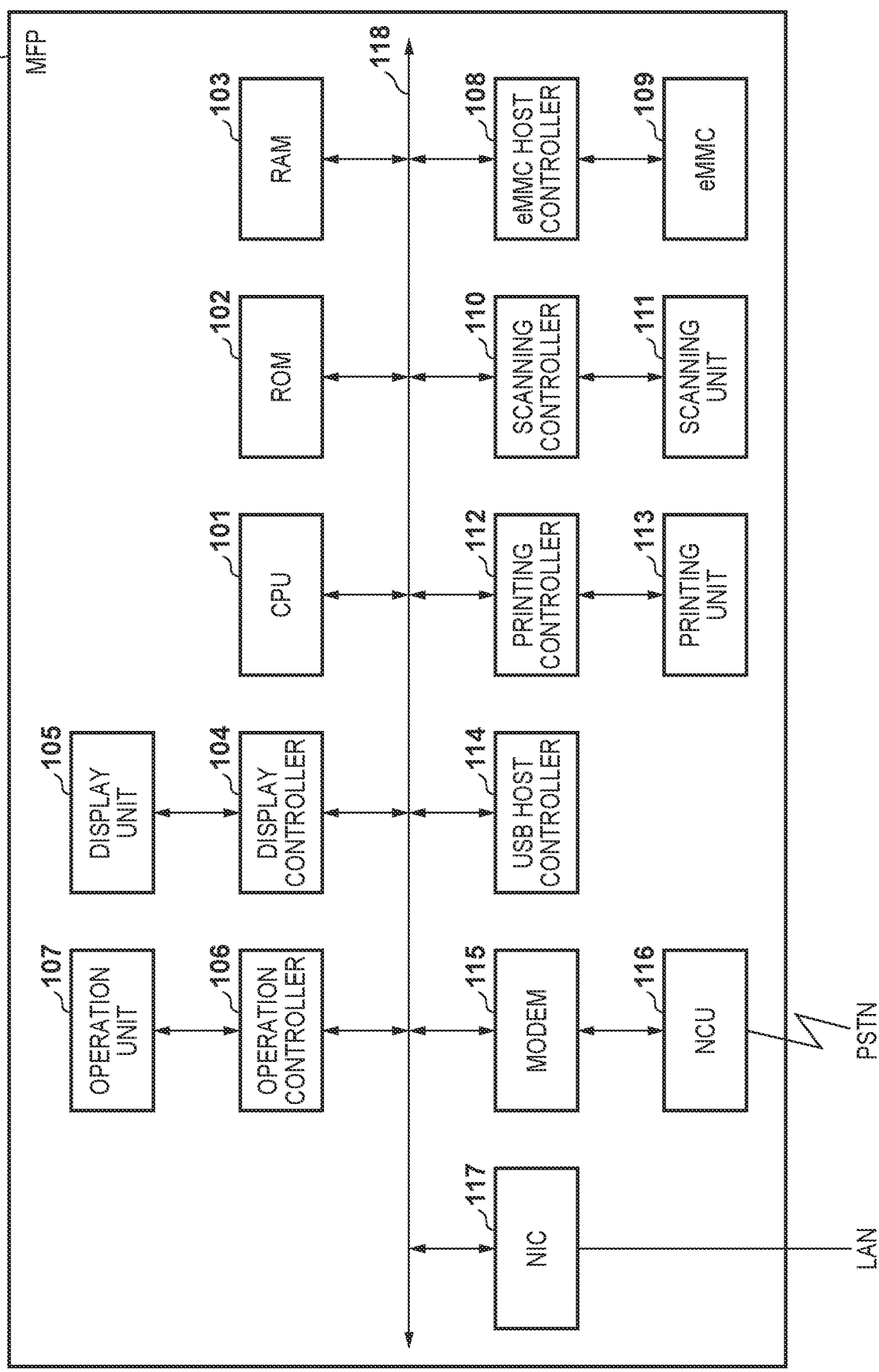
FIG. 1 is a block diagram showing the hardware arrangement of an MFP according to the first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 3:
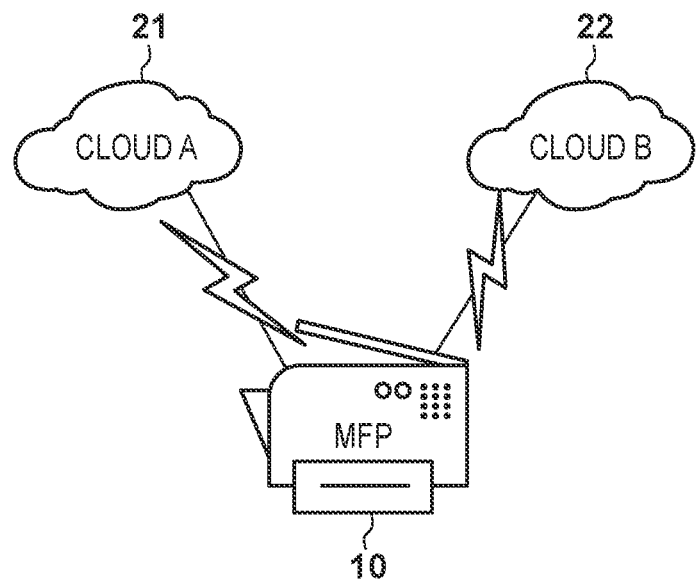
FIG. 3 is a view showing an example of the use environment of an image processing apparatus according to the first embodiment.

FIG. 3 is a schematic view showing an example of the use environment of an image processing apparatus (MFP) according to this embodiment. An MFP 10 can connect to the internet via a wired or wireless network and access a site such as a cloud A 21 or a cloud B 22. Then, as will be described later, the MFP 10 can scan a document by its scanner to generate image data, and transmit the image data to the cloud A 21 or the cloud B 22 in accordance with a protocol defined at each site.

FIG. 1 is a block diagram showing the hardware arrangement of the MFP 10 according to this embodiment. The MFP 10 includes a CPU 101, a ROM (Read Only Memory) 102, a RAM (Random Access Memory) 103, a display controller 104, a display unit 105, an operation controller 106, and an operation unit 107. The MFP 10 also includes an eMMC (embedded Multi Media Card) host controller 108, an eMMC 109, a scanning controller 110, a scanning unit 111, a printing controller 112, and a printing unit 113. The MFP 10 further includes a USB host controller 114, a modem 115, an NCU (Network Control Unit) 116, and a NIC (Network Interface Card) 117.

The CPU 101 comprehensively controls the respective devices connected to a system bus 118. When a power is supplied, the CPU 101 executes a boot program stored in the ROM 102. In general, the CPU 101 that has executed the boot program loads a main program stored in a specific area of the eMMC 109 to the RAM 103, jumps to the head of the loaded main program, and executes the main program. The RAM 103 functions not only as a loading place for the main program but also as a work area for the main program to operate or the like. The CPU 101 generates, for example, information as shown in FIG. 7A, FIG. 7B, FIG. 8, or FIG. 15 by executing each of the control programs shown in FIGS. 9 to 13, FIG. 16, and FIG. 17 to be described later.

The display controller 104 controls a screen rendered on the display unit 105. The display unit 105 is a display such as a liquid crystal display (LCD) or an organic electroluminescence (OLED) display. In this embodiment, the display unit 105 is described as a full bitmap LCD of WVGA size. The operation controller 106 controls input from the operation unit 107. The operation unit 107 is a UI (User Interface) including a touch panel or push buttons formed integrally with the display unit 105.

The scanning unit 111 scans a document. The scanning unit 111 includes a glass plate and a pressing plate that presses a document sheet, and can scan document sheets one by one. In addition, the scanning unit 111 is equipped with an ADF (Auto Document Feeder), and can automatically and sequentially scan a plurality of document sheets. Note that scanning a document using the glass plate is referred to as a pressing plate scan, and scanning a document using the ADF is referred to as an ADF scan hereinafter. The scanning unit 111 is connected to the scanning controller 110, and the CPU 101 can control the scanning unit 111 via the scanning controller 110.

The printing unit 113 is a printer unit that forms an image on a printing sheet by an electrophotographic method. The printing unit 113 is connected to the printing controller 112, and the CPU 101 communicates with the printing unit 113 via the printing controller 112.

The USB host controller 114 takes charge of USB protocol control, and mediates access to a USB device such as a USB flash memory (not shown) connected to the USB host controller 114.

The modem 115 modulates and demodulates a signal necessary for facsimile communication. The modem 115 is connected to the NCU 116, and the signal modulated by the modem 115 is output to a PSTN (Public Switched Telephone Networks) via the NCU 116.

The NIC 117 bidirectionally exchanges data with a mail or file server via a LAN. The NIC 117 also bidirectionally exchanges data with a Web server or the like.

The MFP 10 of this embodiment includes the eMMC 109 as a storage. The CPU 101 accesses the eMMC 109 via the eMMC host controller 108.

Figure 2:
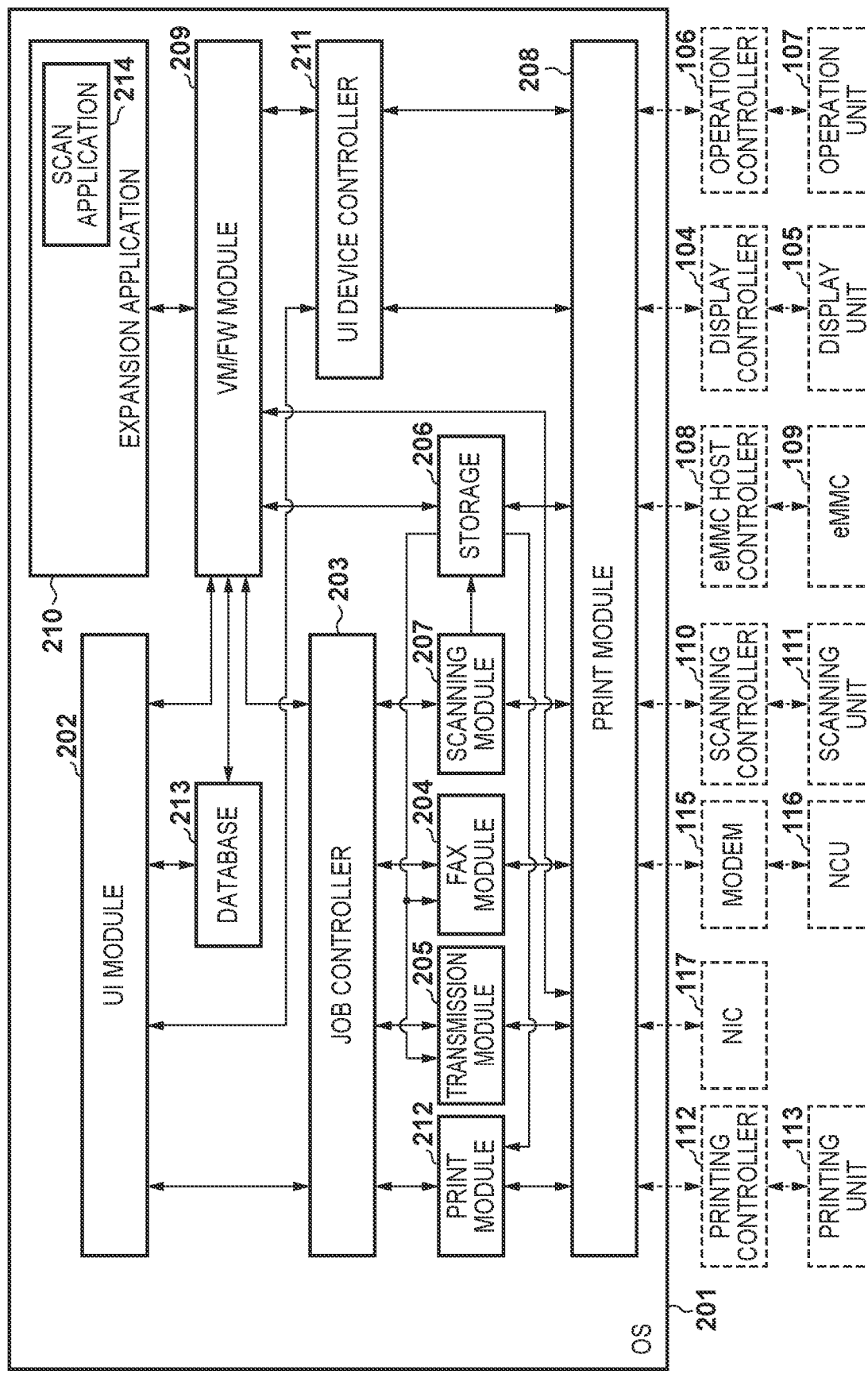
FIG. 2 is a block diagram showing the software arrangement of the MFP according to the first embodiment.

Next, the software arrangement of the MFP 10 according to this embodiment will be described with reference to FIG. 2. Each module indicated by a solid line in FIG. 2 is a software module implemented by the CPU 101 executing the main program loaded to the RAM 103 by the boot program described above. Each unit indicated by a broken line is the hardware component described with reference to FIG. 1. Each of dashed arrows represents a communication line between each of the hardware components and a device driver 208.

The main program manages and controls execution of each module to be described later by an OS (Operating System) 201. The OS 201 includes the device driver 208. The device driver 208 mediates exchange with the hardware device such as at least any one of the display controller 104, operation controller 106, and scanning controller 110.

A UI (User Interface) module 202 provides various types of information to a user via the display unit 105 and the operation unit 107, and accepts various types of instructions from the user. Various types of settings for switching the behavior of the MFP 10 can also be changed by the UI module 202. Various types of settings changed by the UI module 202 are physically stored in the eMMC 109 via a database 213. The display language setting which is changed by the UI module 202 is one of the various types of settings.

A job controller 203 accepts a job such as copying, printing, or faxing, and controls execution of the accepted job.

A storage 206 is a software module that physically stores, for example, image data received by a scanning module 207 and data such as application settings requested from an expansion application 210 in the eMMC 109 and manages them. For example, in the MFP 10 according to this embodiment, when the job controller 203 accepts an SMB transmission job, the scanning module 207 receives the job request and controls the scanning unit 111 to scan a document. Then, the scanned image data is stored in the storage 206. The image data stored in the storage 206 is read out by a transmission module 205 and transmitted to an SMB file server via the NIC 117.

The MFP 10 of this embodiment includes a VM (Virtual Machine)/FW (Framework) module 209. The expansion application 210 is physically arranged on the eMMC 109, and accommodates a plurality of applications from an arbitrary program and the like written in a script language. For example, a program language such as JAVA®, which is an interpreter that interprets and executes bytecode, or LUA may be used. The VM/FW module 209 takes charge of installing/uninstalling an arbitrary program written in a script language or a predetermined high-level language into/from the expansion application 210. At the same time, the application status information including whether the installed application is enable or disable is held on the storage 206. The VM/FW module 209 is also equipped with an ability to, if there is an archive with a plurality of compressed pre-installed applications on the ROM 102, expand and install them in the expansion application 210 as needed.

Further, the VM/FW module 209 takes charge of, for example, arbitration between a function implemented by an arbitrary program installed in the expansion application 210 and an existing function. The VM/FW module 209 can, in response to user selection of a button displayed on the display unit 105, load the script language of the corresponding application on the RAM 103 and interpret and execute the contents thereof. Thus, the MFP 10 of this embodiment can easily implement an arbitrary additional function such as a scan application 214. Furthermore, the VM/FW module 209 can refer to or change various types of setting values in the database 213 in response to a request from an application installed in the expansion application 210.

A UI device controller 211 can enable the UI module 202 and the expansion application 210 to output various types of information to the display unit 105, and can transmit a user operation acquired via the operation unit 107 to the UI module 202 and the expansion application 210.

Note that in this embodiment, the components of the OS 201 excluding the expansion application are referred to as "firmware".

Figure 4:
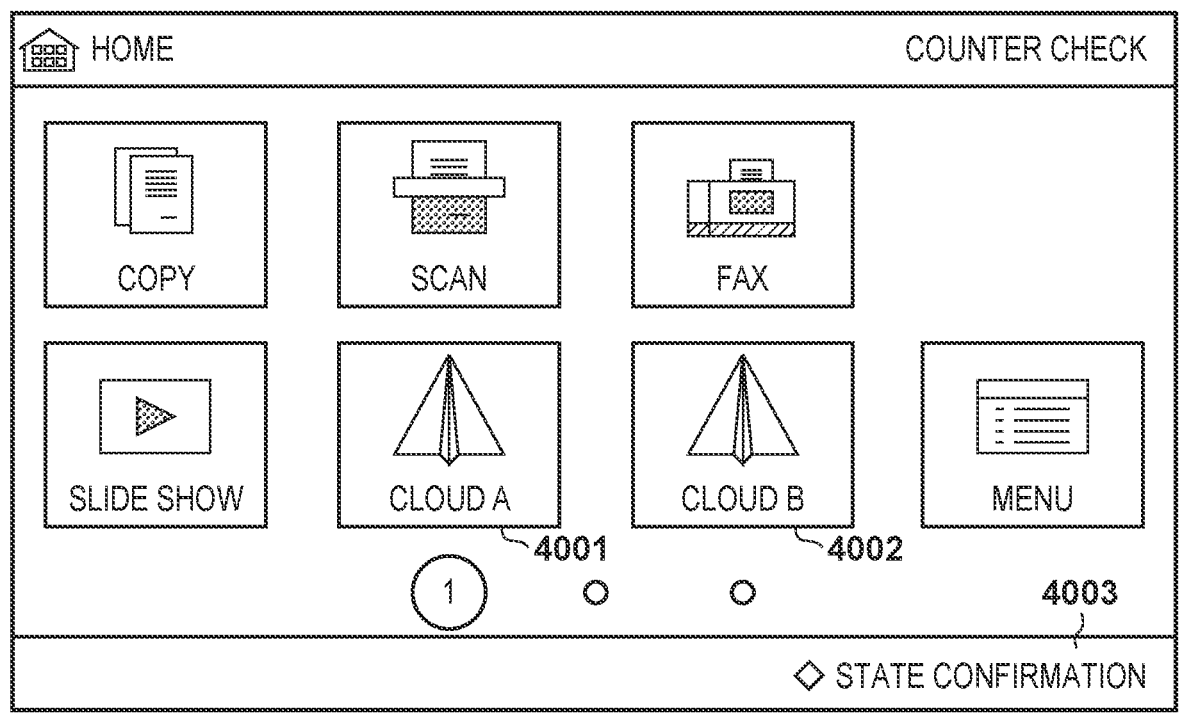
FIG. 4 is a view showing an example of a home screen according to the first embodiment.

FIG. 4 shows an example of a home screen displayed on the display unit 105 of the MFP 10 including the scan application 214.

The scan application 214 stores various types of settings such as a scan attribute and destination information by a user who transmits a scanned image to the cloud A 21 and the cloud B 22 shown in FIG. 3. In response to a request from the UI module 202 in FIG. 2, the scan application 214 storing the various types of settings passes, to the cloud B to the UI module 202, the icon data of a transmission button 4001 to the cloud A and the icon data of a transmission button 4002. Then, the UI module 202 displays the screen shown in FIG. 4 on the display unit 105.

Figure 13:
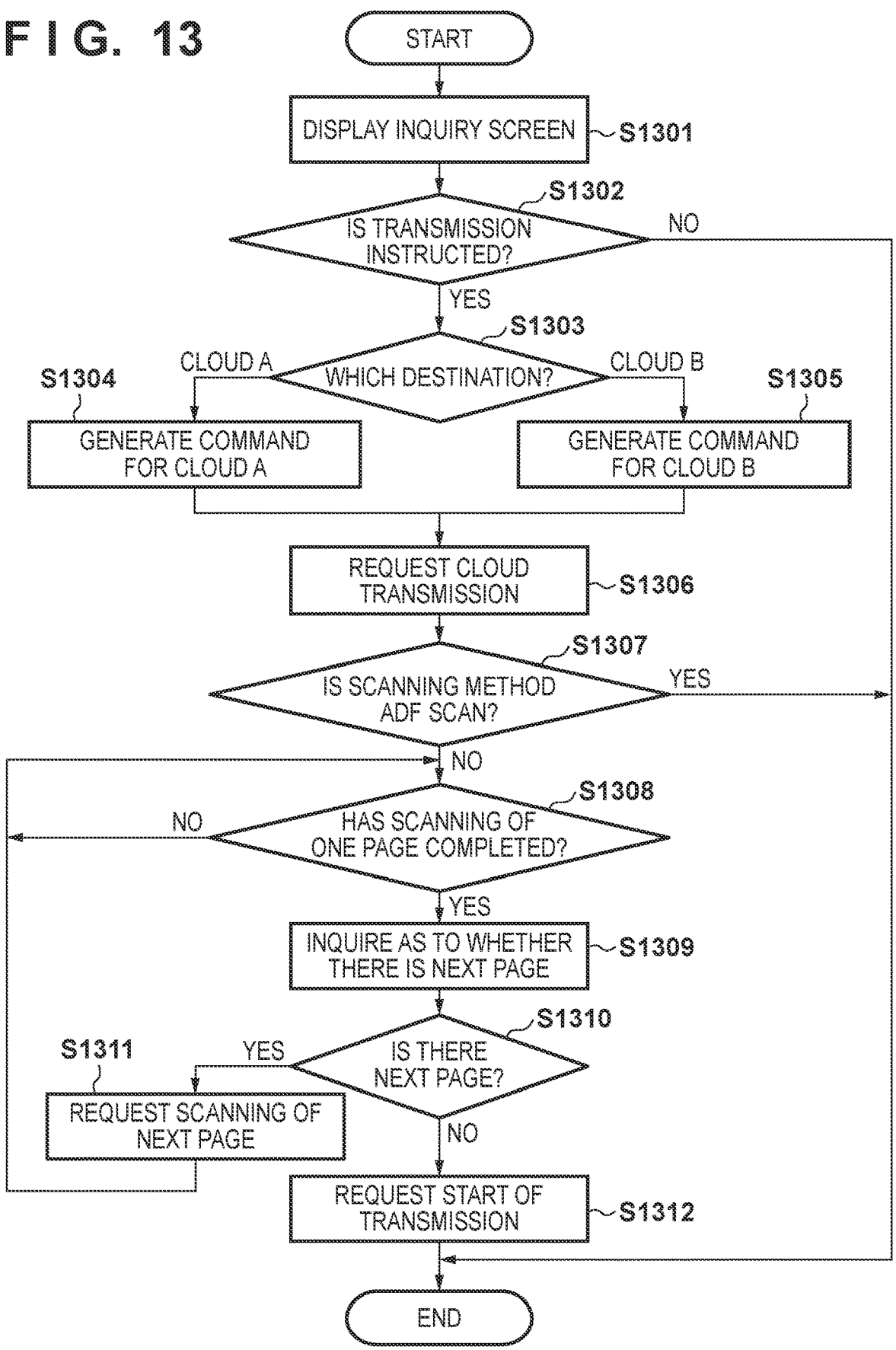
FIG. 13 is a flowchart illustrating the procedure of a cloud button process according to the first embodiment.

FIG. 13 is a flowchart illustrating the procedure of a cloud button process executed by the MFP 10 when a user presses the transmission button 4001 or 4002 shown in FIG. 4.

Here, the cloud button process shown in FIG. 13 is part of the process constituting the scan application 214 in FIG. 2. As described above, the script language or the predetermined high-level language is interpreted and executed by the VM/FW module 209. Note that the CPU 101 eventually executes a process for interpreting and executing the script language or predetermined high-level language in the VM/FW module 209. Note that in the description of FIG. 13, it is assumed that the subject that executes the process is the CPU 101 that executes the scan application 214.

First, in step S1301, the CPU 101 controls the display unit 105 to display a screen for inquiring whether to execute transmission. For example, the CPU 101 may control the display unit 105 to display a transmission button and a cancel button, and request a further input from the user.

Then, the CPU 101 advances the process to step S1302, and determines whether the user has operated the operation unit 107 to instruct transmission. If it is determined that transmission is instructed (YES in step S1302), the CPU 101 advances the process to step S1303. If it is determined that transmission is canceled (NO in step S1302), the CPU 101 terminates the process illustrated in FIG. 13.

In step S1303, the CPU 101 checks whether the pressed button is the transmission button 4001 to the cloud A or the transmission button 4002 to the cloud B. If the destination is the cloud A (cloud A in step S1303), the CPU 101 advances the process to step S1304, and if the destination is the cloud B (cloud B in step S1303), the CPU 101 advances the process to step S1305.

In step S1304, the CPU 101 generates a command for requesting transmission to the cloud A, and advances the process to step S1306. In step S1305, the CPU 101 generates a command for requesting transmission to the cloud B, and advances the process to step S1306. An example of the command for requesting transmission to the cloud A is shown in FIG. 5, and an example of the command for requesting transmission to the cloud B is shown in FIG. 6. The contents of each command will be described later.

Next, in step S1306, the CPU 101 issues the command generated in step S1304 or step S1305, issues an HTTP transmission job to the job controller 203 via the VM/FW module 209, and advances the process to step S1307.

In step S1307, the CPU 101 receives information from the job controller 203 via the VM/FW module 209, and determines whether the scanning method of the document corresponding to the requested HTTP transmission job is the ADF scan or the pressing plate scan. If the scanning method is the ADF scan (YES in step S1307), the scanning of the document and the transmission of the scanned data are completed by the transmission job issued to the job controller 203 in step S1306. Accordingly, the CPU 101 terminates the cloud button process illustrated in FIG. 13. On the other hand, if the document scanning method is the pressing plate scan (NO in step S1307), the CPU 101 advances the process to step S1308.

In step S1308, the CPU 101 acquires the status of the pressing plate scan via the VM/FW module 209, and waits for the completion of the scanning of one page by the pressing plate scan. When scanning of one page is completed, the process advances to step S1309 to inquire the user whether to scan a next page.

Then, the process advances to step S1310, and it is determined whether the user operation in response to the inquiry in step S1309 is an operation instructing to scan a next page. If it is determined that a user operation instructing to scan a next page has been received (YES in step S1310), the process advances to step S1311. In step S1311, the CPU 101 instructs the job controller 203 to scan a next page via the VM/FW module 209, and returns the process to step S1308.

On the other hand, if it is determined that a user operation instructing to scan a next page has not been received (NO in step S1310), the CPU 101 requests the job controller 203 to start HTTP transmission via the VM/FW module 209 in step S1312, and terminates the cloud button process.

As described above, after a transmission request is issued in the case of the ADF scan or after a transmission start request is made in the case of the pressing plate scan, the firmware takes charge of the transmission process via the HTTP. Accordingly, the scan application 214 need not continuously monitor the transmission process. It is configured such that the user can check the transmission status or cancel the transmission process by pressing a status check button 4003 shown in FIG. 4.

Figure 12:
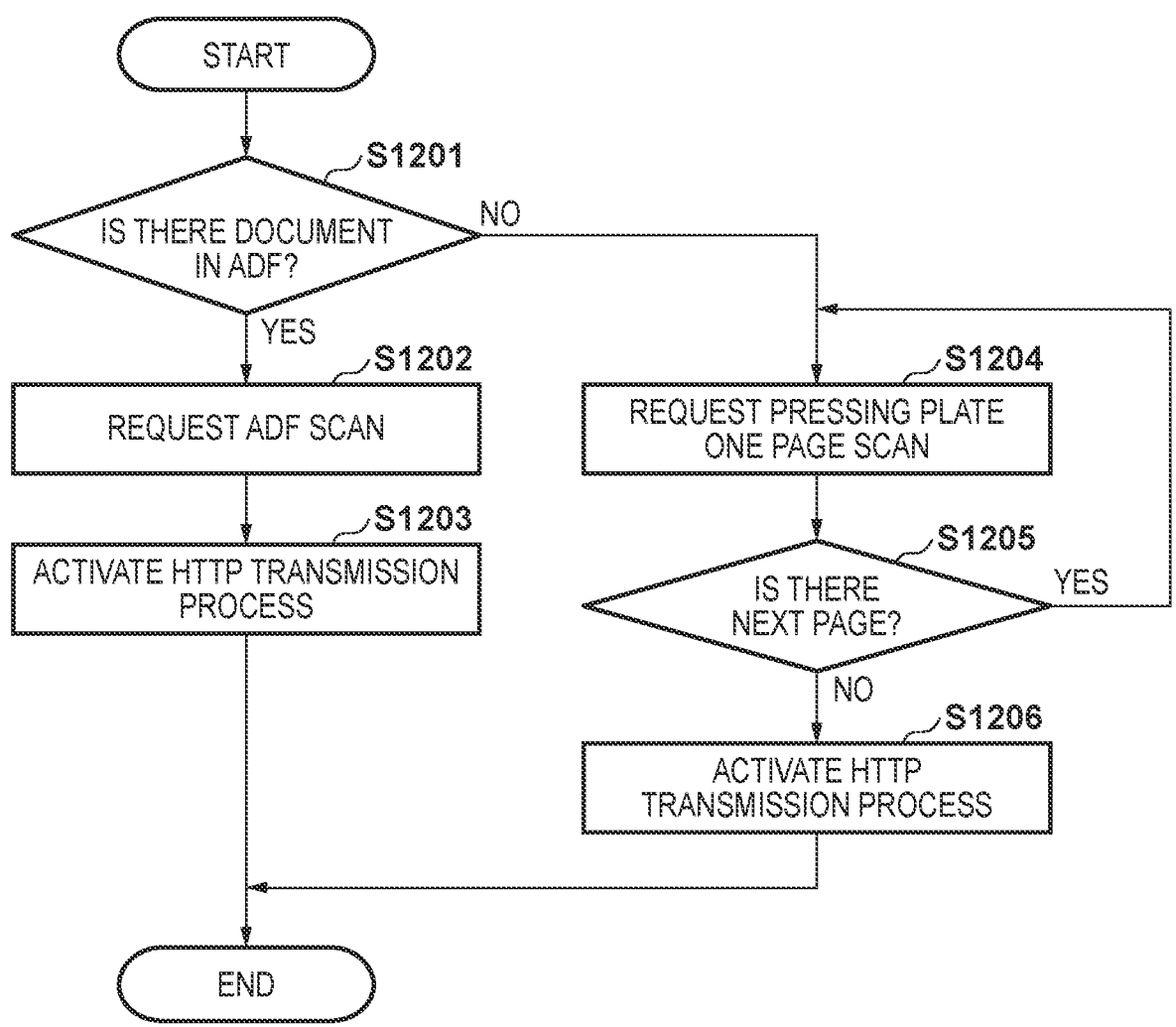
FIG. 12 is a flowchart illustrating the procedure of a cloud transmission process according to the first embodiment.

FIG. 12 is a flowchart illustrating the procedure of a cloud transmission process in this embodiment. The cloud transmission process illustrated in FIG. 12 is part of the process constituting the job controller 203, and is executed by the CPU 101. When the HTTP transmission job is instructed to the job controller 203 in step S1306 shown in FIG. 13 by the scan application 214 in FIG. 2, the process illustrated in FIG. 12 is started.

First, in step S1201, it is checked whether there is a document in the ADF on the scanning unit 111. If there is a document in the ADF (YES in step S1201), the CPU 101 advances the process to step S1202. Otherwise, the job controller 203 advances the process to step S1204.

In step S1202, the CPU 101 requests activation of the scanning module 207 in FIG. 2, and causes the scanning module 207 to execute an ADF scan. The scanning module 207 requested to execute the ADF scan sequentially scans all the document sheets until there is no more document sheet in the ADF. Data obtained by scanning the document is managed on a page basis and stored in the storage 206. A detailed description of the scanning process is omitted. After requesting activation of the scanning module 207 in step S1202, the CPU 101 advances the process to step S1203. Note that the CPU 101 may advance the process to step S1203 before the scanning process requested in step S1202 is completed.

Figure 9:
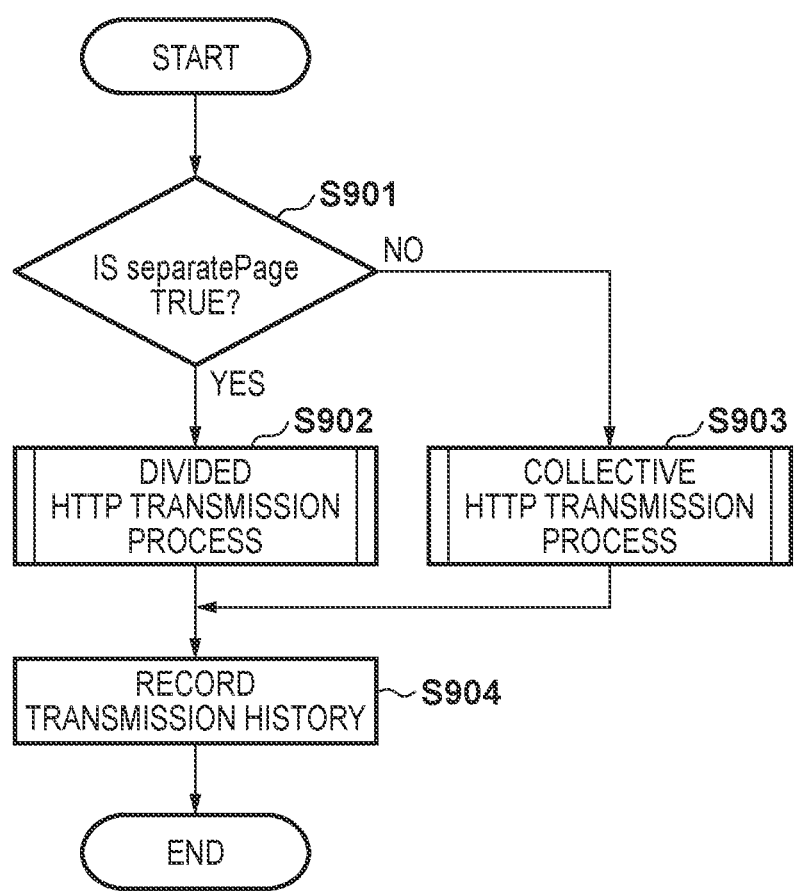
FIG. 9 is a flowchart illustrating the procedure of an HTTP transmission process according to the first embodiment.

In step S1203, the CPU 101 executes the process illustrated in FIG. 9 to be described later, and terminates the cloud transmission process illustrated in FIG. 12.

On the other hand, if there is no document in the ADF in step S1201 (NO in step S1201), the CPU 101 advances the process to step S1204, requests the OS to activate the scanning module 207 in FIG. 2, and causes the scanning module 207 to execute a pressing plate scan for each page. As in the ADF scan, data obtained by scanning the document is managed on a page basis and stored in the storage 206.

Then, the CPU 101 advances the process to step S1205, and waits for a scanning request for a next page from the user in step S1306 in FIG. 13. If it is determined that a scanning request has been received (YES in step S1205), the job controller 203 returns the process to step S1204 to execute a pressing plate scan for a next page. If it is determined that the scanning request for a next page has not been received and the HTTP transmission start request in step S1312 in FIG. 13 has been received (NO in step S1205), the process advances to step S1206.

In step S1206, the job controller 203 requests activation of the transmission module 205 in FIG. 2, causes it to execute the process illustrated in FIG. 9 to be described later, and terminates the cloud transmission process.

Next, the procedure of an HTTP transmission process will be described with reference to FIG. 9.

An HTTP transmission process is part of the process constituting the transmission module 205 in FIG. 2, and is executed by the CPU 101. In this embodiment, the HTTP transmission process will be described assuming that it is executed when requested by the job controller 203 in step S1203 or step S1206 in FIG. 12.

First, in step S901, it is determined whether a separatePage parameter included in the command issued in step S1306 in FIG. 13 is true or false. If the separatePage parameter is true (YES in step S901), the transmission module 205 advances the process to step S902. If the separatePage parameter is false (NO in step S901), the process advances to step S903.

Figure 10:
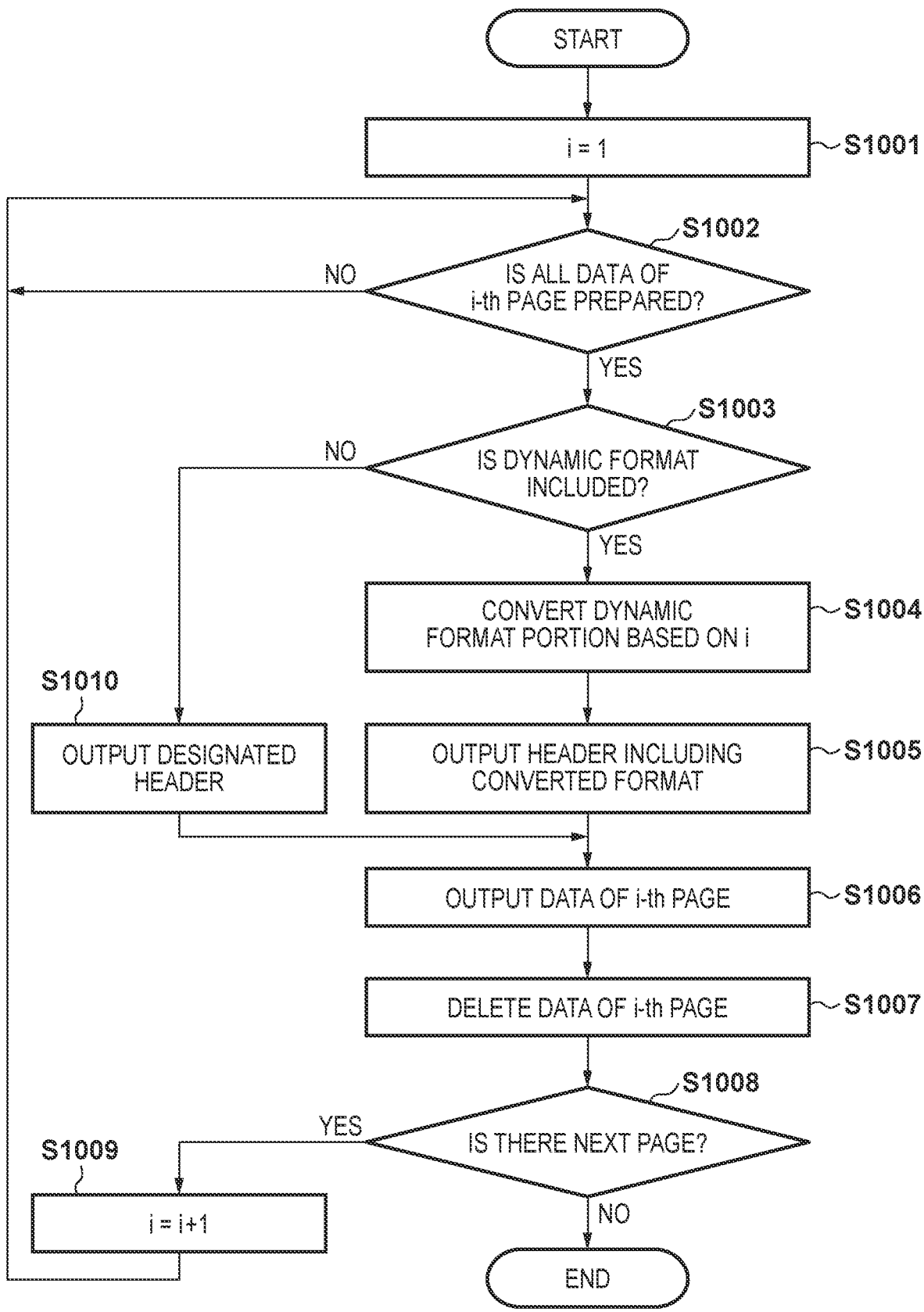
FIG. 10 is a flowchart illustrating the details of the divided transmission process according to the first embodiment.

For example, in the example shown in FIG. 5, since the value of a separatePage parameter 500 is true, the CPU 101 advances the process to step S902 and executes a process (divided HTTP transmission process) of performing HTTP transmission, in which transmission is divided for each page, to be described later with reference to FIG. 10. On the other hand, in the example shown in FIG. 6, since the value of a separatePage parameter 600 is false, the CPU 101 advances the process to step S903 and executes a process (collective HTTP transmission process) of performing HTTP transmission in which, for example, a group of pages such as all pages is collectively transmitted. The details of each of the divided HTTP transmission process and the collective HTTP transmission process will be described later. When the HTTP transmission is completed in step S902 or step S903, the CPU 101 advances the process to step S904, records the transmission history, and terminates the HTTP transmission process shown in FIG. 9. With this configuration, the application need not monitor the HTTP transmission process by the firmware, and application complexity can be prevented.

Next, the procedure of the divided HTTP transmission process in step S902 in FIG. 9 will be described with reference to FIG. 10.

First, the CPU 101 initializes a variable i indicating a page number in step S1001, and advances the process to step S1002. In step S1002, the CPU 101 waits for all the data of the i-th page to be prepared. As described above, since the data obtained by scanning the document is managed on a page basis and stored in the storage 206, if all the data of the i-th page is prepared in the storage 206 (YES in step S1002), the process advances to step S1003.

In step S1003, the CPU 101 determines whether dynamic format information is included in the command issued in step S1306 in FIG. 13. In this embodiment, it is described assuming that a part enclosed by "{}" in a request line or header included in an issued command is handled as dynamic format information (dynamic format).

For example, in the example shown in FIG. 5, each of "{04}" of a url parameter 501 and "{04}" of an httpHeader parameter array 502 is the dynamic format. Therefore, if the command shown in FIG. 5 is issued, the CPU 101 determines that the dynamic format is included (YES in step S1003), and advances the process to step S1004.

In step S1004, the dynamic format is converted based on the index value i to generate a request line and a header. In this embodiment, the dynamic format enclosed by "{}" is converted as follows.

For example, if the dynamic format is "{n}" (n is a natural number), the dynamic format is converted into a character string obtained by expressing the index value i in an n-digit decimal number. More specifically, for example, if n=5 and i=11, "{5}" is converted into "11".

If the dynamic format is "{0n}", when a character string obtained by expressing the index value i in a decimal number is a number having the number of digits smaller than that of an n-digit number, 0 is added to the head of the character string. More specifically, if n=4 and i=12, "{04}" is converted into "0012". If the number of digits of i exceeds n, the number of digits of the decimal number may be increased as required by i.

Figure 7A:
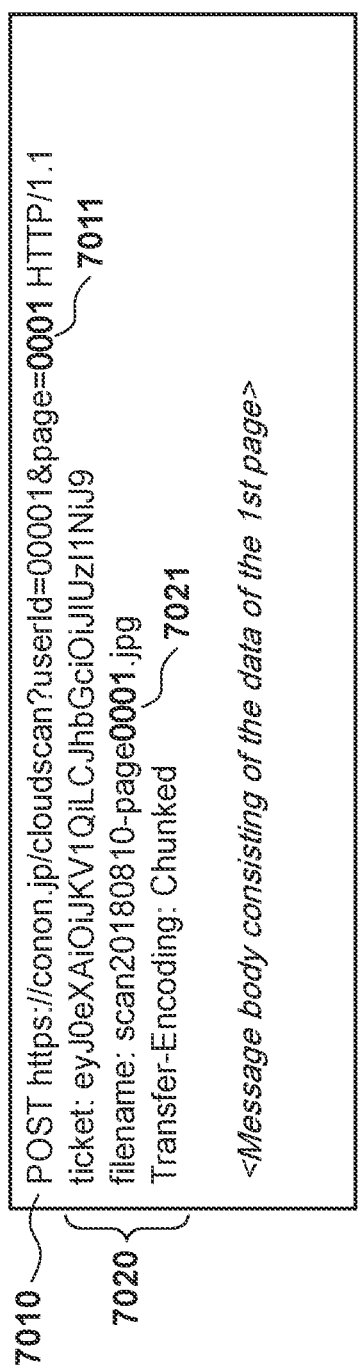
FIGS. 7A and 7B are views each showing an example of an HTTP message transmitted in the divided transmission process according to the first embodiment.
Figure 7B:
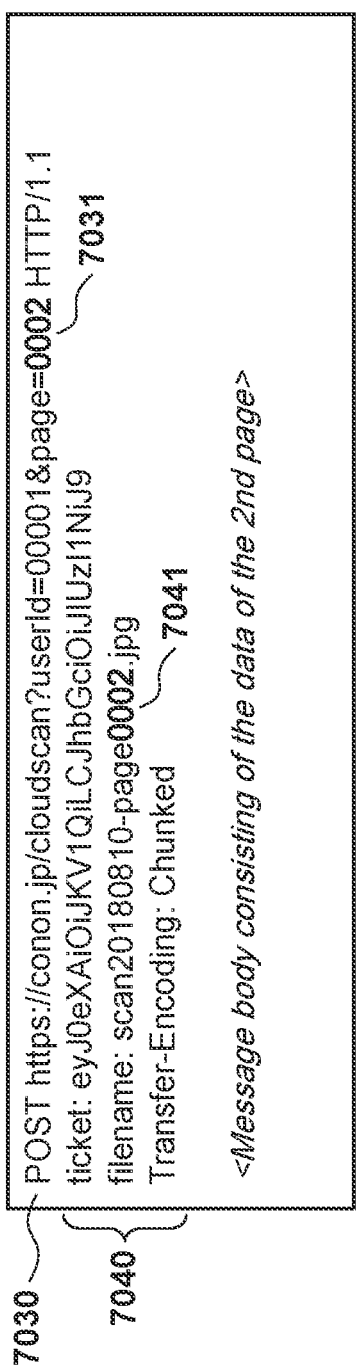

Subsequently, in step S1005, the CPU 101 outputs the HTTP header converted in step S1004 including the converted format. Each of FIGS. 7A and 7B shows an example of the HTTP header output when the command issued in step S1306 in FIG. 13 is the command shown in FIG. 5. If the first page is scanned, that is, if i=1 in step S1004, a request line 7010 including "0001", which is a decimal character string 7011 obtained by converting "{04}" included in the url parameter 501 based on i, is output.

A header 7020 including "0001", which is a decimal character string 7021 obtained by converting "{04}" of a filename parameter 503 of the httpHeader parameter array 502 similarly based on i, is output. At this time, other necessary fixed header information such as "Transfer-Encoding" is output as appropriate.

Subsequently, the CPU 101 advances the process to step S1006, reads out the image data of the i-th page from the storage 206, adds it to the body part of the message shown in each of FIGS. 7A and 7B, and outputs it.

Subsequently, the CPU 101 advances the process to step S1007, deletes, from the storage 206, the data of the i-th page that has been output, and advances the process to step S1008.

Thus, in a relatively inexpensive image processing apparatus, even if it is required to reduce the capacity of the storage for storing image data due to cost constraints, it is possible to scan a multipage document and store it in the storage while sequentially deleting the data that has been transmitted. That is, it is possible to prevent the failure of the scan transmission process due to storage exhaustion. In addition, since the firmware executes deletion of the image data, it is possible to reduce complicated control that the application constantly monitors the available capacity of the storage and executes of transmission of data and deletion of data that has been transmitted.

In step S1008, the CPU 101 determines whether there is a next page. For example, it may be determined that there is a next page if there is a document in the ADF of the scanning unit 111, or it may be determined that there is a next page if there is at least part of data of the next page in the storage 206. If there is a next page (YES in step S1008), the CPU 101 advances the process to step S1009, increases the index value i indicating the page number by one, and returns the process to step S1002. For example, if the output of the data of the first page is completed in step S1006 and it is determined in step S1008 that there is a next page, the process advances to step S1009, i=2 is set, and processing from step S1002 is repeated. In other words, in step S1004, a request line 7030 including "0002", which is a decimal character string 7031 obtained by converting "{04}" of the url parameter 501 based on i, is output. In addition, a header 7040 including the character string "0002" obtained by converting "{04}" of the filename parameter 503 of the httpHeader parameter array 502 based on i is output. If it is determined in step S1008 that there is no next page (NO in step S1008), the CPU 101 terminates the divided HTTP transmission process shown in FIG. 10.

In step S1003, if it is determined that the command includes no dynamic format (NO in step S1003), the CPU 101 advances the process to step S1010. In step S1010, the CPU 101 outputs a character string obtained by adding necessary information to the url parameter of the issued command. In addition, the character string designated in the httpHeader parameter array is output without being converted. Note that in step S1010, although the dynamic format is not converted, necessary additional fixed header information such as "Transfer-Encoding" may be added to the HTTP header. Subsequently, the CPU 101 advances the process to step S1006.

Figure 8:
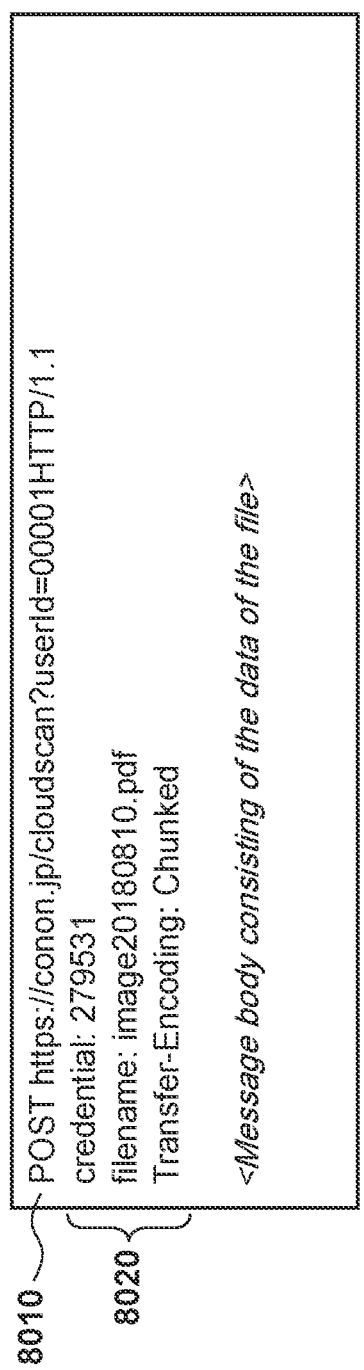
FIG. 8 is a view showing an example of an HTTP message transmitted in the collective transmission process according to the first embodiment.
Figure 11:
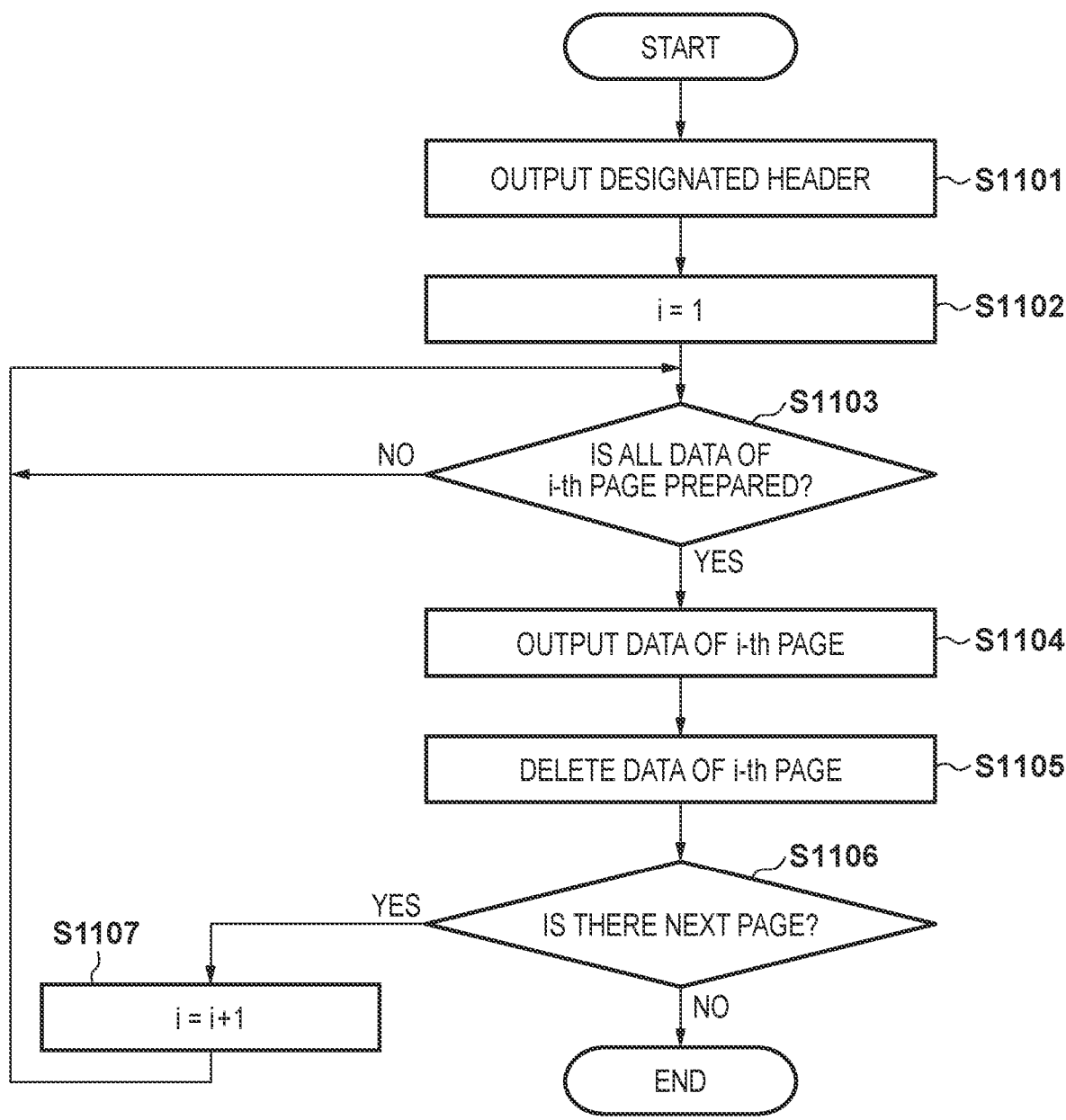
FIG. 11 is a flowchart illustrating the details of the collective transmission process according to the first embodiment.

Next, the procedure of the collective HTTP transmission process executed in step S903 in FIG. 9 will be described with reference to FIG. 11. Note that in the collective HTTP transmission process, it may not be required to dynamically designate the HTTP header. Therefore, first, in step S1101, the HTTP header designated in the command issued in step S1306 in FIG. 13 is output intact. FIG. 6 shows an example of a command in which the separatePage parameter is false. An example of the HTTP header to be output is shown in FIG. 8. As can be seen from FIGS. 6 and 8, the request line designated in the command is output intact. Also, a header 8020 designated in the httpHeader parameter array is output intact.

In step S1101, a character string 8010 obtained by adding necessary information to the url parameter of the issued command is output. For example, necessary additional fixed header information such as "Transfer-Encoding" is output as appropriate. Then, the process advances to step S1102. In step S1102, the CPU 101 initializes the index value i indicating the page number. That is, i=1 is set.

Subsequently, the CPU 101 advances the process to step S1103 and waits for all the data of the i-th page to be prepared. If it is determined that all the data of the i-th page is prepared in the storage 206 (YES in step S1103), the CPU 101 advances the process to step S1104.

In step S1104, the CPU 101 reads out the data of the i-th page from the storage 206, adds it as a Message body to the HTTP header shown in FIG. 8, and outputs it. Then, the CPU 101 advances the process to step S1105, deletes, from the storage 206, the data of the i-th page that has been output, and advances the process to step S1106.

In step S1106, it is determined whether there is a next page. If it is determined that there is a next page (YES in step S1106), the CPU 101 advances the process to step S1107, increases the index value i indicating the page number by one, and returns the process to step S1103. If it is determined that there is no next page (NO in step S1106), the collective HTTP transmission process illustrated in FIG. 11 is terminated.

As has been described above, in the first embodiment, the expansion application can designate arbitrary information such as a URL or HTTP header in a dynamic format upon requesting a job and cause the firmware to execute the job. In addition, by using a dynamic format, an HTTP header including information indicating a file to be transmitted or a destination that is different for each page can be generated. With this configuration, the expansion application need not take charge of deletion of image data, a transmission process using the HTTP protocol, and a management process such as recording of the transmission history.

Second Embodiment

The first embodiment is configured to be able to collectively designate an arbitrary HTTP request line and header in a dynamic format upon requesting a job. However, some cloud services accept an HTTP message in a multipart format. In this case, it may be required to designate an arbitrary character string or a character string different for each page not only in the request line and header but also in the multipart header included in the body. In the second embodiment, an HTTP transmission process in which an arbitrary character string can be designated in the HTTP multipart header will be described.

Figure 16:
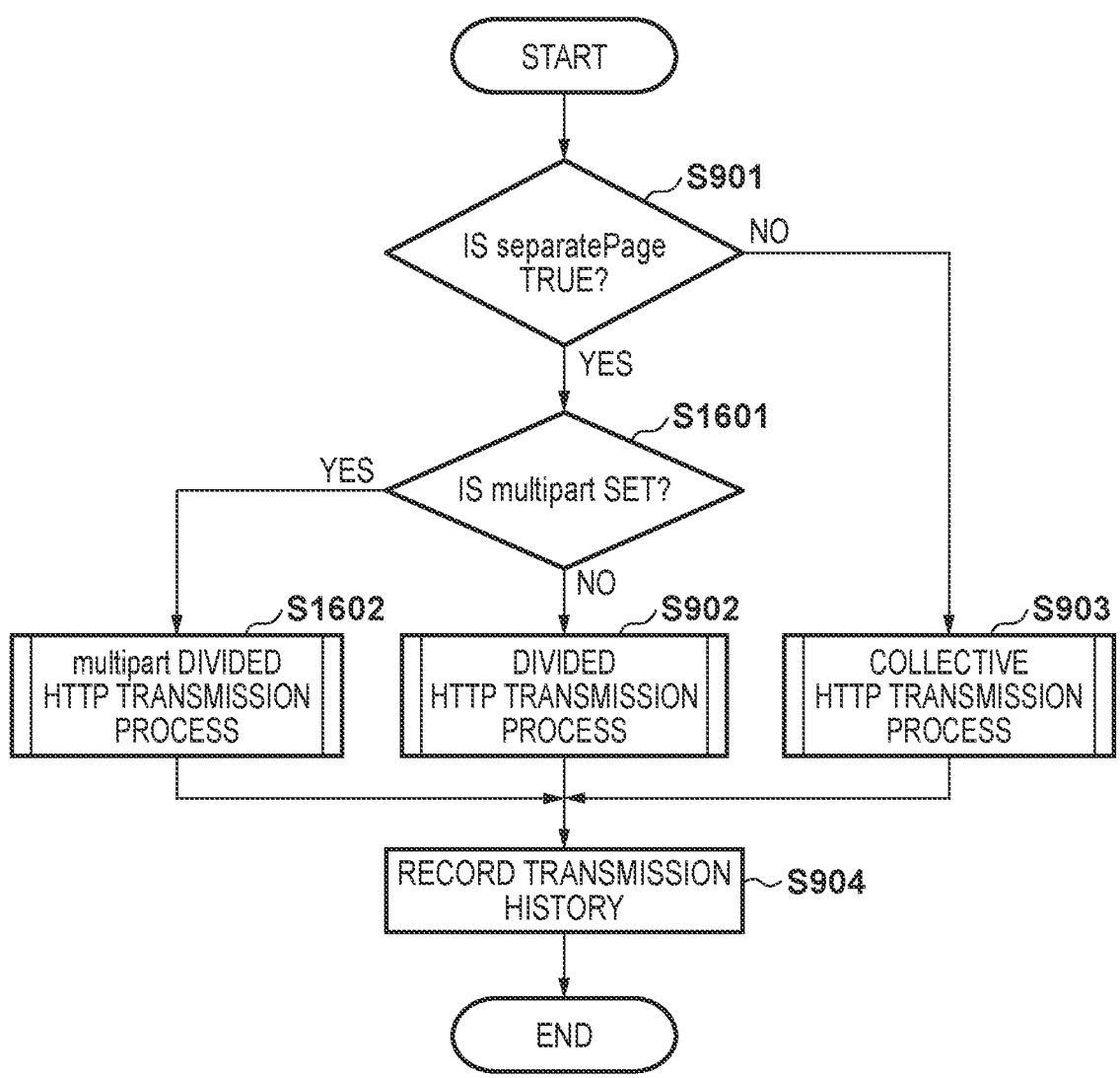
FIG. 16 is a flowchart illustrating the procedure of an HTTP transmission process according to the second embodiment.

FIG. 16 is a flowchart illustrating the procedure of an HTTP transmission process according to the second embodiment. It is different from the transmission process illustrated in FIG. 9 in that step S1601 is executed between step S901 and step S902.

In step S1601, it is determined whether a multipart parameter is included in a command issued in step S1306 in FIG. 13. A multipart parameter is a parameter indicating that the content included in the HTTP message is a decoded data type (multipart). In this embodiment, it is assumed that information indicating a file to be transmitted is designated by the multipart parameter.

If it is determined that a multipart parameter is included in the command issued in step S1306 (YES in step S1601), a CPU 101 advances the process to step S1602. FIG. 14 shows an example of the command in which the separatePage parameter is true and the multipart parameter is included. Since the command shown in FIG. 14 includes a multipart parameter 1410, the process advances to step S1602.

In step S1602, a multipart divided HTTP transmission process is executed, and the process advances to step S904.

Figure 17:
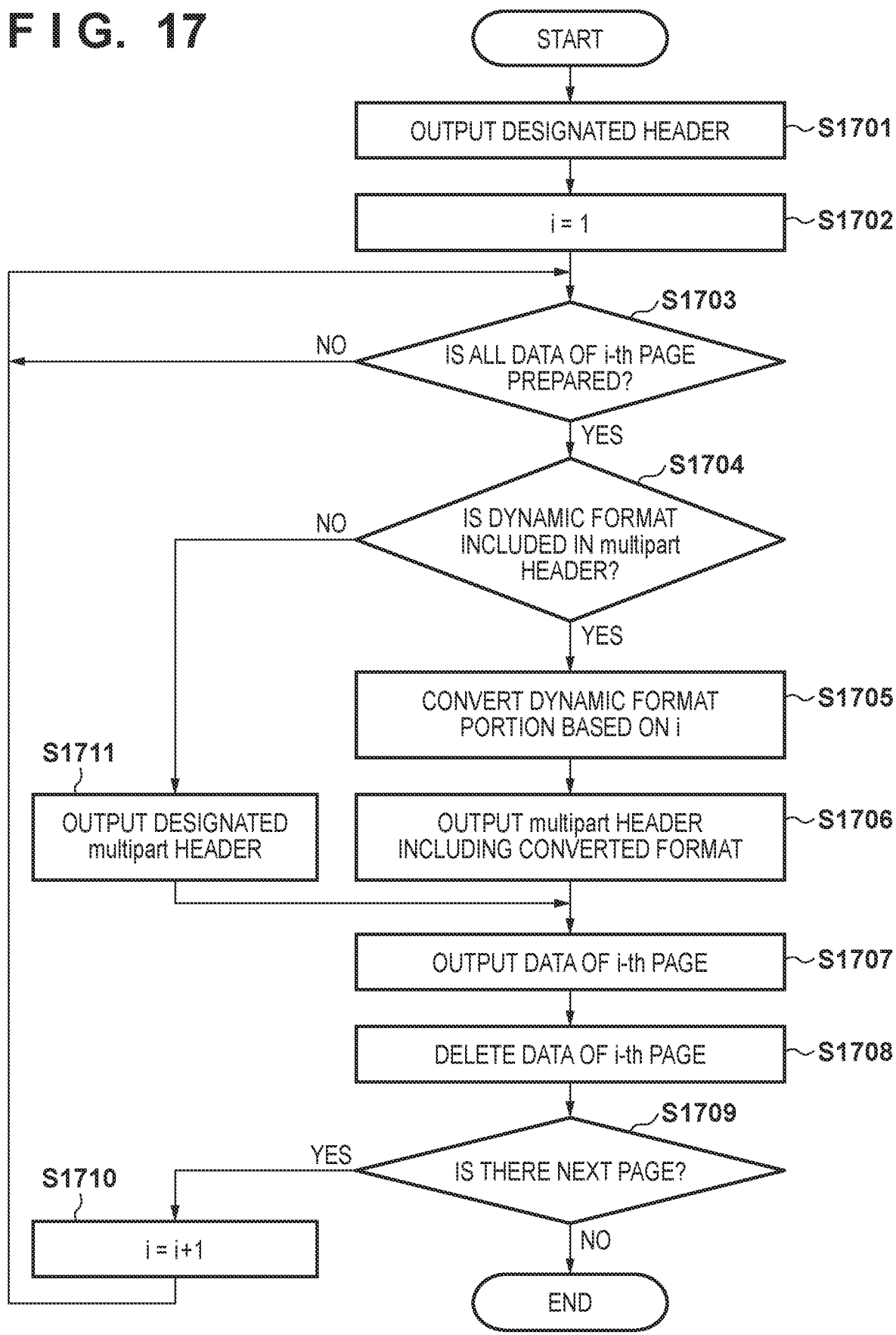
FIG. 17 is a flowchart illustrating the details of the multipart transmission process according to the second embodiment.

FIG. 17 is a flowchart illustrating the detailed process procedure of multipart divided HTTP transmission. The multipart divided HTTP transmission process is executed in step S1602 in FIG. 16.

First, in step S1701, the HTTP header designated in the command issued in step S1306 in FIG. 13 is output intact. As shown in FIG. 14, a separatePage parameter 1400 is true, but the command includes the multipart parameter 1410. Accordingly, it is not required to make the header dynamic for each page. Therefore, each of a url parameter 1401 and an hllpHeader parameter array 1402 in FIG. 14 does not include a dynamic format.

In step S1701, a request line 15010 obtained by adding necessary information to the url parameter of the issued command is output. An example of the HTTP message to be output is shown in FIG. 15. In this embodiment, a character string 15020 designated in the httpHeader parameter array is output intact. In addition, a header 15030 including Content-Type information 15031 with the value (here, "form-data") of a type parameter 1411 of the multipart parameter 1410 added thereto, and "boundary" information 15032 is output. Furthermore, for example, other necessary fixed header information such as "Transfer-Encoding" is output as appropriate. Then, the process advances to step S1702.

In step S1702, an index value i indicating a page number is initialized.

Subsequently, the CPU 101 advances the process to step S1703 and waits for all the data of the i-th page to be prepared. If it is determined that all the data of the i-th page is prepared in a storage 206, the process advances to step S1704.

In step S1704, the CPU 101 checks whether a dynamic format portion is included in the multipart parameter of the issued command. For example, in the example shown in FIG. 14, "{03}" is included in the value of a name parameter 1413 of a header parameter array 1412 in the multipart parameter 1410. Therefore, in the example shown in FIG. 14, the CPU 101 determines in step S1704 that the command includes a dynamic format (YES in step S1704), and advances the process to step S1705.

In step S1705, the CPU 101 converts the dynamic format portion based on the index value i as in the first embodiment.

Subsequently, in step S1706, an http header related to multipart including the converted format is output. First, a boundary character string 15040 indicating the boundary of the multipart is output. Then, if i=1, a multipart header 15050 including a decimal character string "001" obtained by converting "{03}" included in the value of the name parameter of the header parameter array 1412 based on i is output. At this time, other necessary fixed header information such as "Content-Transfer-Encoding" is output as appropriate.

Thereafter, the CPU 101 advances the process to step S1707, reads out the data of the i-th page from the storage 206, and outputs it as the multipart body of the i-th page shown in FIG. 15.

In step S1708, the CPU 101 deletes, from the storage 206, the data of the i-th page that has been output, and advances the process to step S1709.

In step S1709, the CPU 101 determines whether there is a next page. If it is determined that there is a next page (YES in step S1709), the CPU 101 advances the process to step S1710, increases the index value indicating the page number by one, and returns the process to step S1703. That is, i=2 is set, processing from step S1703 to step S1705 is executed, a boundary character string 15060 is output in step S1706, and then a multipart header is output. For example, the dynamic format "{03}" included in the value of the name parameter 1413 in FIG. 14 is converted based on i, and a multipart header 15070 including a decimal character string "002" is generated and output. If it is determined in step S1709 that there is no next page, the multipart page-divided http transmission process is terminated.

On the other hand, if it is determined in step S1704 that the command includes no dynamic format, the process advances to step S1711. In step S1711, all the character strings designated in the header parameter array of the multipart parameter of the issued command are output intact. In addition, necessary additional fixed header information such as "Content-Transfer-Encoding" is output as appropriate. Then, the process advances to step S1707. Since processing after step S1707 is similar to that described above, a description thereof is omitted.

As described above, the image forming apparatus according to the second embodiment accepts a command including a dynamic format so as to designate an arbitrary character string or a character string different for each page in the multipart header included in the Message body.

Other Embodiments

In each of the first and second embodiments described above, it has been described that a dynamic format is not used in the case of a collective transmission process. However, in an example, a dynamic format may be used even in the case of a collective transmission process. For example, when a character string "{YYYYMMDD}" indicates the date on which a scan transmission process is executed, "image {YYYYMMDD}.pdf" can be used in the command for designating the file name for the collective transmission process in the HTTP header 8020 in FIG. 8. That is, any conversion may be performed as long as the firmware can accept and convert the format. Thus, the application can be configured more easily.

In each of the first and second embodiments described above, the example in which only the scan application 214 is installed has been shown. However, this is merely an example, and the application of the present invention is not limited to this.

In each of the first and second embodiments, the scan application 214 that can select transmission to one of two cloud services of the cloud A and the cloud B is shown as an example. However, in an example, the present invention can support any cloud service if the present invention can support it by changing the URL, http header, and Message body header by modifying the scan application 214 without modifying the firmware.

In each of the first and second embodiments, http transmission and data deletion are executed in synchronization for each page. However, synchronization between http transmission and data deletion need not be executed for each page. For example, synchronization between http transmission and data deletion may be executed for a bandwidth of 8 KB or the like. According to this, it becomes possible to implement http transmission by the ADF scan using a smaller storage capacity.

In each of the first and second embodiments, a predetermined character string is output as the header of each of Transfer-Encoding and Content-Transfer-Encoding. In an example, an arbitrary character string can be designated for each of these additional parameters. This enables provision of a system with a higher degree of freedom.

In each of the first and second embodiments, a dynamic format is designated by being enclosed by "11". However, the method of designating a dynamic format is not limited to this. For example, a dynamic format can be designated using a grammar such as "%04d", which is used for printf in C language or the like.

In each of the first and second embodiments, the firmware is configured to record the transmission history. However, if there is no need to record transmission history information, the transmission history may not be recorded and arbitrary information such as a URL or http header may be collectively designated in a dynamic format upon requesting a job.

In each of the first and second embodiments, the JSON format is used as a command for requesting transmission. However, the command is not limited to the JSON format. For example, an arbitrary character string can be designated even in the XML format.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-004621, filed on Jan. 15, 2019, which is hereby incorporated by reference herein in its entirety.

What is claimed is:

1. An image processing apparatus that transmits image data to an external server according to a predetermined protocol, comprising:
   a scanner; and
   a processor that:
      executes an application for generating a job to cause the scanner to scan a plurality of documents and for issuing predetermined information to a firmware of the image processing apparatus to cause the firmware to generate a header, wherein the predetermined information is dynamic format information for instructing the firmware to generate a different header for each page of the job; and
      executes the firmware of the image processing apparatus to generate, based on the issued predetermined information, headers of a plurality of pages of image data generated by scanning the plurality of documents,
   wherein the generated headers are headers of the predetermined protocol and are different for each page, and
   wherein the image processing apparatus transmits the generated headers and the image data.

2. The image processing apparatus according to claim 1, further comprising a storage that stores the image data generated by scanning the plurality of documents,
   wherein the processor deletes, from the storage, the image data whose transmission is completed.

3. The image processing apparatus according to claim 1, wherein the processor records information related to a transmission history when transmission of the image data is completed.

4. The image processing apparatus according to claim 1, wherein the predetermined protocol is HTTP, and the headers are HTTP headers.

5. The image processing apparatus according to claim 1, wherein each of the headers include a file name of each of a plurality of files to be generated based on the plurality of pages of the image data.

6. The image processing apparatus according to claim 1, further comprising a display, wherein the processor executes the application to cause the display to display a screen of a function for transmitting the image data.

7. The image processing apparatus according to claim 1, wherein the application is a transmitting application for transmitting the image data.

8. The image processing apparatus according to claim 1, wherein the processor does not execute the application for generating the headers of the image data.

9. A control method for controlling an image processing apparatus that transmits image data to an external server according to a predetermined protocol, comprising:

executing an application for generating a job to scan a plurality of documents and for issuing predetermined information to a firmware of the image processing apparatus to cause the firmware to generate a header, wherein the predetermined information is dynamic format information for instructing the firmware to generate a different header for each page of the job; and executing the firmware of the image processing apparatus to generate, based on the issued predetermined information, headers of a plurality of pages of image data generated by scanning the plurality of documents, wherein the generated headers are headers of the predetermined protocol and are different for each page; and transmitting the generated headers and the image data.

\* \* \* \* \*